June 23, 1959 G. W. JONES 2,891,504
DOG MUZZLE
Filed April 3, 1957
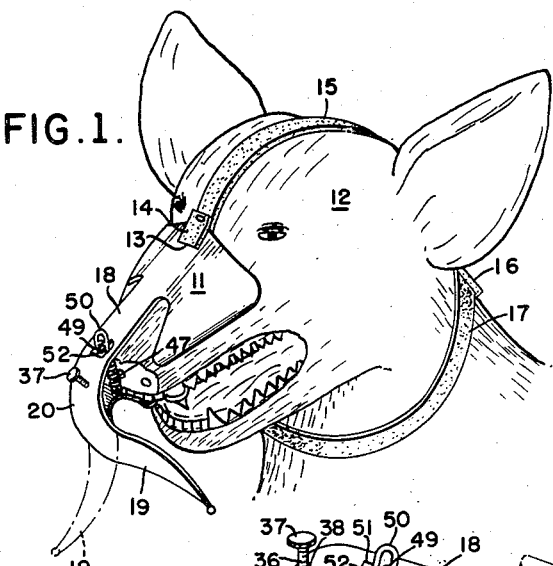
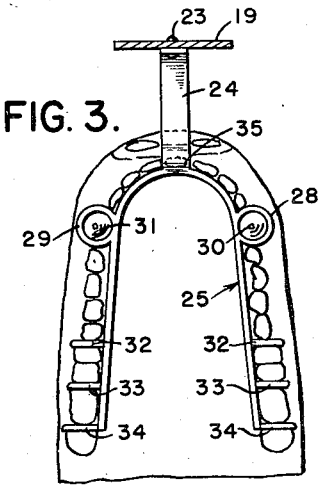
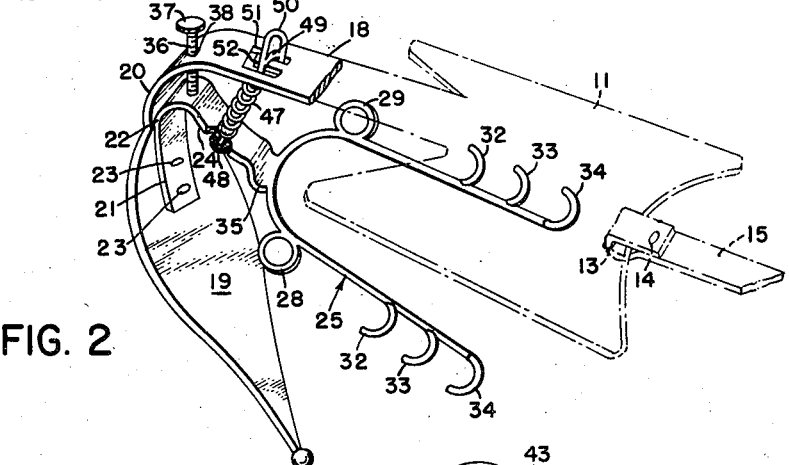
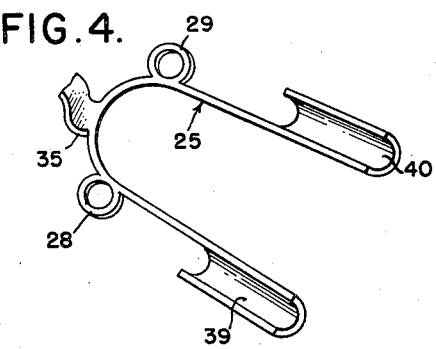
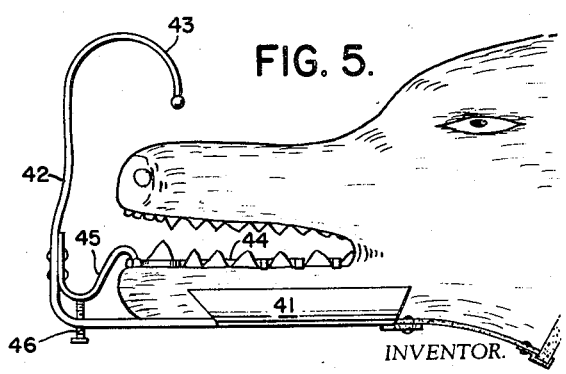
INVENTOR.
George W. Jones
BY
Albert J. Kramer
ATTORNEY

United States Patent Office 2,891,504
Patented June 23, 1959

2,891,504

DOG MUZZLE

George W. Jones, Winchester, Va.

Application April 3, 1957, Serial No. 650,338

7 Claims. (Cl. 119—130)

This invention relates to muzzles and it is more particularly concerned with muzzles for application to animals, especially dogs, to prevent them from attacking and injuring humans or other animals.

One of the objects of this invention is the provision of a dog muzzle which does not detrimentally restrain the opening of the animal's mouth, thereby permitting him to breathe and pant as he may desire, this being an important natural function in controlling the body temperature of a dog, especially in warm weather and/or after being exercised.

To restrain a dog from the natural function of freely breathing and panting is, actually, unhealthful to the animal and another object of the invention is to obviate such an unhealthful condition which is presented by conventional types of muzzles in general use.

A further object of the invention is the provision of a muzzle which will permit the animal, while the muzzle is in place, to lap water or other liquids.

A still further object of the invention is the provision of a dog muzzle which can be worn with comfort and which will be effective to prevent the dog from biting other animals, persons, or eating indiscriminately, such as from garbage cans.

These and other objects of the invention, its features and advantages, will appear more fully from the following description considered conjunctively with the accompanying drawings.

In the drawing:

Fig. 1 is a perspective view of an embodiment of the invention applied to the upper jaw of a dog.

Fig. 2 is another perspective view of the embodiment removed from the dog, and partly phantomized.

Fig. 3 is a bottom plan view of a portion of the embodiment in its seated relation relative to the upper jaw of the animal.

Fig. 4 is a bottom plan view of a part of a modified embodiment.

Fig. 5 is a side view of another embodiment of the invention applied to the lower jaw of a dog.

Referring with more particularity to the drawing in which like numerals designate like parts, the embodiment illustrated in Figs. 1, 2 and 3 comprises a plate 11 curved concavely at its bottom to fit over the nose bridge between the nostrils and the eyes of a dog 12, as shown. A slot 13 is provided at the rear of the plate 11 for engaging the loop 14 of a strap 15 which is attached by another loop 16 to a collar 17 around the dog's neck.

The forward part 18 of the plate 11 extends first along the nose bridge and then beyond the nostrils, then curving downwardly to a vertical position in front of and spaced from the dog's mouth to form a shield or guard 19 which terminates at a point below the lower jaw, substantially as shown.

To the inner side of the guard 19 just below the curved portion 20, the vertical leg 21 of an angle bracket 22 is secured such as by rivets 23. The bracket 22 has a resilient horizontal cantilever portion 24 which extends rearwardly and is integral with a U-shaped mouthpiece 25. The mouthpiece 25 and plate 11, connected together by the cantilever portion 24, form a clamp for one of the jaws of the animal.

The mouthpiece carries a pair of loops 28, 29 which are adapted to engage the upper fang teeth 30, 31 of the dog, and a series of pairs of hooks 32, 33, and 34 for engaging molar teeth on either side toward the rear of the upper jaw. A U-bend or recess 35 in the portion 24 is a seat for the upper front teeth of the animal.

An abutment screw 36 having a knurled head 37 threadedly engages an aperture 38 in the top portion and passes therefrom downwardly to contact the cantilever portion 24. By turning the screw to move downwardly against the portion 24, the latter is urged against its resiliency to provide a wider spacing between the plate 11 and the mouthpiece 25 to the extent necessary in any particular case to place the device on the jaw of the dog, whereupon the screw is retracted permitting the mouthpiece and nosepiece 11 to move toward each other under the resilient force. The final pressure against the jaw can thus be controlled by means of this screw, a greater amount of retraction resulting in a greater pressure, and vice versa.

Also, a coil spring 47 may be added having one end secured to the portion 24 by an anchor bolt 48. The other end is provided with a vertical outer loop 49 and inner vertical loop 50 which are adapted to pass through an aperture 51 in the upper part 18. A finger 52 projects from one side of the aperture 52 to engage the inner loop 50 when the muzzle is in place, to securely hold it in position. To remove the muzzle, the loop is moved off the finger 52, whereupon the muzzle quickly opens up and can be removed from the animal.

The outer part of the device, including the plate 11 and the front guard piece 19 is made of resilient sheet material, such as sheet steel, aluminum, brass, or other suitable material, to render the guard resiliently deformable. Thus the animal can move the guard piece against the resilient action of the material with a paw and upon release, it will return to its original position in front of the mouth. Also, it enables a person to feed the dog piecemeal without removing the muzzle or to render oral administration otherwise while the muzzle is in place.

In the case of older dogs, for example, or other dogs who may have lost their back molar teeth, the modified form of Fig. 4 provides solid bridge pieces 39 and 40, one on either side of the teeth clamps to fill the spaces left vacant by the loss of the teeth and hence provide a more comfortable fit.

Fig. 5 is an inverted form of the invention. Instead of the plate 11 being on top of the upper jaw, a plate 41 is provided to fit along the bottom of the lower jaw and the guard piece 42, corresponding to the guard piece 19 of the first embodiment, extends upwardly, instead of downwardly in front of the animal's mouth, with an inverted U-loop 43 at the top terminating just above the nose to limit the extent to which the mouth can be opened. Also, the mouthpiece 44 is attached to the teeth of the lower jaw, but it is similarly connected to the guard piece by a bracket 45 and is provided with a similar adjusting screw 46.

Having thus described my invention, I claim:

1. An animal muzzle comprising a plate adapted to fit against an exterior portion of the animal adjacent the mouth, a guard member integral with and extending forwardly and vertically relative to the plate, a mouthpiece adapted to be placed within the animal's mouth in engagement with dental members therein, a bracket having a resilient cantilever portion extending from the guard piece adjacent said plate, said cantilever portion being connected to and supporting said mouthpiece, and means engaging the plate and cantilever portion for adjusting the position of the cantilever portion relative to the plate and for holding it in different positions of adjustment.

2. An animal muzzle comprising an elongated vertical guard member for disposition across the front of and out of contact with the upper and lower jaws of an animal's mouth, and means connected to one end of the guard member for releasably engaging the upper and lower sides of one of said jaws, exclusive of the other jaw, the other end of the guard member being free of any other connection to the device.

3. An animal muzzle comprising an elongated vertical guard member for disposition across the front of and out of contact with the upper and lower jaws of an animal's mouth, and a two-part clamp adapted to be releasably secured against the upper and lower sides of one jaw of the animal, one end only of said guard member being connected to and supported by said clamp.

4. An animal muzzle comprising an elongated vertical guard member for disposition across the front of the upper and lower jaws of an animal's mouth, a two-part clamp connected to said member, said clamp being adapted to receive and hold one of the jaws of the animal without restraining the relative movements of the jaws.

5. An animal muzzle as defined by claim 4 in which the clamp comprises an exterior plate part and an interior mouthpiece for engaging teeth of the jaw.

6. An animal muzzle as defined by claim 5 and means between the interior piece and the exterior plate for adjusting their positions relative to each other.

7. An animal muzzle as defined by claim 5 in which the clamp is resilient and means between the interior piece and the exterior plate for adjusting the pressure which the clamp can exert upon the jaw of the animal under its resilient action.

References Cited in the file of this patent

UNITED STATES PATENTS

| 881,405 | Hoppenrath | Mar. 10, 1908 |
| 1,065,459 | Madsen | June 24, 1913 |

FOREIGN PATENTS

| 453,382 | Germany | Nov. 24, 1927 |